(12) United States Patent
Kopetz et al.

(10) Patent No.: US 10,671,382 B2
(45) Date of Patent: Jun. 2, 2020

(54) DEVICE AND METHOD FOR INTEGRATING SOFTWARE COMPONENTS INTO A DISTRIBUTED TIME-CONTROLLED REAL-TIME SYSTEM

(71) Applicant: TTTech Computertechnik AG, Vienna (AT)

(72) Inventors: Hermann Kopetz, Baden (AT); Stefan Poledna, Klosterneuburg (AT)

(73) Assignee: TTTECH AUTO AG, Vienna (AT)

( * ) Notice: Subject to any disclaimer, the term of this patent is extended or adjusted under 35 U.S.C. 154(b) by 0 days.

(21) Appl. No.: 15/738,874

(22) PCT Filed: Jun. 16, 2016

(86) PCT No.: PCT/AT2016/050208
§ 371 (c)(1),
(2) Date: Jan. 11, 2018

(87) PCT Pub. No.: WO2016/205842
PCT Pub. Date: Dec. 29, 2016

(65) Prior Publication Data
US 2018/0165089 A1    Jun. 14, 2018

(30) Foreign Application Priority Data

Jun. 25, 2015    (AT) .............................. A 50549/2015

(51) Int. Cl.
*G06F 8/71*    (2018.01)
*G06F 9/54*    (2006.01)
(Continued)

(52) U.S. Cl.
CPC ................. *G06F 8/71* (2013.01); *G06F 8/65* (2013.01); *G06F 9/4887* (2013.01); *G06F 9/54* (2013.01); *H04L 67/34* (2013.01); *H04L 67/10* (2013.01)

(58) Field of Classification Search
CPC .... G06F 8/60–61; G06F 8/63–64; G06F 8/76; G06F 8/65–71; G06F 9/4887–54; H04L 67/10–34
See application file for complete search history.

(56) References Cited

U.S. PATENT DOCUMENTS 6,021,457 A * 2/2000 Archer ................ G06F 11/3404
710/260
7,334,216 B2 * 2/2008 Molina-Moreno ....... G06F 8/35
717/105
(Continued)

FOREIGN PATENT DOCUMENTS

WO    2014/094023 A1    6/2014
WO    2015/131214 A1    9/2015

OTHER PUBLICATIONS

Hermann Kopetz, Why a Global Time is Needed in a Dependable SoS, Cornell University Library, pp. 1-4 (Year: 2014).*
(Continued)

*Primary Examiner* — S. Sough
*Assistant Examiner* — Zheng Wei
(74) *Attorney, Agent, or Firm* — Eversheds Sutherland (US) LLP

(57) ABSTRACT

The invention relates to a device for integrating software components of a distributed real-time software system, said components being run on target hardware and on a development system, wherein the target hardware comprises computing nodes, and the development system comprises one or more computers. The device is designed as an expanded development system in which the computing nodes of the target hardware are connected to the computers of the development system via one or more time-controlled distributor units, wherein the expanded development system has a sparse global time of known precision, and wherein the computing nodes of the target hardware are connected to the (Continued)

computers of the development system via the one or more time-controlled distributor units such that the data content of a TT message template of a TT platform of the target hardware can be provided both by a simulation process of the development system as well as by an operative process of the target hardware in a timely manner.

6 Claims, 1 Drawing Sheet

(51) Int. Cl.
*G06F 9/48* (2006.01)
*G06F 8/65* (2018.01)
*H04L 29/08* (2006.01)

(56) References Cited

U.S. PATENT DOCUMENTS

| | | | |
|---|---|---|---|
| 7,349,512 B2* | 3/2008 | Rausch | G04G 7/00 |
| | | | 370/216 |
| 7,937,500 B2 | 5/2011 | Fletcher et al. | |
| 8,015,323 B2* | 9/2011 | Wunderlich | H04L 29/12254 |
| | | | 700/16 |
| 8,245,239 B2* | 8/2012 | Garyali | G06F 12/0269 |
| | | | 711/170 |
| 8,301,885 B2* | 10/2012 | Kopetz | H04L 12/4015 |
| | | | 370/464 |
| 8,464,065 B2 | 6/2013 | Kopetz | |
| 8,826,072 B2* | 9/2014 | Catthoor | G06F 11/14 |
| | | | 709/219 |
| 8,914,794 B2* | 12/2014 | Bliss | G06F 8/63 |
| | | | 717/101 |
| 9,407,696 B2 | 8/2016 | Poledna | |
| 9,614,744 B2 | 4/2017 | Poledna | |
| 2003/0140333 A1 | 7/2003 | Odaka et al. | |
| 2004/0064517 A1* | 4/2004 | Uenoyama | H04L 67/1095 |
| | | | 709/207 |
| 2008/0112439 A1* | 5/2008 | Vestal | H04J 3/0661 |
| | | | 370/516 |
| 2009/0216779 A1* | 8/2009 | Hazlewood | G06F 9/54 |
| 2010/0082117 A1* | 4/2010 | Korsberg | G05B 19/0421 |
| | | | 700/3 |
| 2012/0233442 A1* | 9/2012 | Shah | G06F 9/3806 |
| | | | 712/207 |
| 2014/0331209 A1* | 11/2014 | Singh | G06F 11/3688 |
| | | | 717/127 |
| 2015/0078399 A1 | 3/2015 | Poledna et al. | |
| 2015/0237130 A1* | 8/2015 | Hui | H04L 67/12 |
| | | | 709/248 |
| 2016/0147568 A1 | 5/2016 | Poledna et al. | |
| 2016/0211987 A1 | 7/2016 | Fidi | |

OTHER PUBLICATIONS

Kopetz et al., TTP—A Time-Triggered Protocol for Fault-Tolerant Real-Time Systems, published by IEEE, pp. 524-533 (Year: 1993).*
Kopetz et al.,The Time-Triggered Ethernet (TTE) Design, Proceedings of the Eighth IEEE International Symposium on Object-Oriented Real-Time Distributed Computing (ISORC'05), published by IEEE, pp. 1-12 (Year: 2005).*
Hermann Kopetz, The Time-Triggered Architecture, published by IEEE (Year: 2003).*
Steinhammer et al., A Time-Triggered Ethernet (TTE) Switch, Proceedings of the Design Automation & Test in Europe Conference, published by IEEE, pp. 1-6 (Year: 2006).*
Armengaud et al., "Automotive Software Architecture: Migration Challenges from an Event-Triggered to a Time-Triggered Communication Scheme", published by 2009 Seventh Workshop on Intelligent solutions in Embedded Systems , pp. 1-9 (Year: 2009).*
International Search Report and Written Opinion for PCT/AT2016/050208, dated Sep. 27, 2016 (13 pages).
Office Action issued in Austrian Application No. A 50549/2015, dated Oct. 2, 2015 (4 pages).
Kopetz, H. Real-time Systems-Design Principles for Distributed Embedded Applications. Springer Verlag, 2011, Chapter 3, pp. 62-64.
Kopetz H. Real-time Systems-Design Principles for Distributed Embedded Applications. Springer Verlag, 2011, Chapter 3, pp. 52-56; 64-65.
Kopetz, H., "Why do we need a sparse global time-base in dependable real-time systems?". 2007 International IEEE Symposium on Precision Clock Synchronization (ISPCS) for Measurement, Control and Communication, Oct. 1-3, 2007, Vienna, Austria, pp. 13-17.
Suethanuwong, E. "Scheduling time-triggered traffic in TTEthernet systems". Proceedings of the 2012 IEEE 17th Conference on Emerging Technologies & Factory Automation (ETFA 2012), Sep. 2012, Krakow,Poland, pp. 17-21.
Wilhelm, R., et al., (2008). The Worst-Case Execution Time Problem-Overview of Methods and Survey of Tools. ACM Trans, on Embedded Computer Systems, vol. 7, No. 3, Article 36, pp. 1-53.

* cited by examiner

DEVICE AND METHOD FOR INTEGRATING SOFTWARE COMPONENTS INTO A DISTRIBUTED TIME-CONTROLLED REAL-TIME SYSTEM

The invention relates to a device for integrating software components of a distributed real-time software system, said components being run on target hardware and on a development system, wherein the target hardware comprises computing nodes, and the development system comprises one or more computers.

The invention further relates to a method for integrating software components of a distributed real-time software system on a device of this type.

Within the architectural design of a large real-time system, a given task is divided into a plurality of software components. A software component is a part of a software system that exchanges data and control signals with other parts of the software system (other software components) via specified interfaces. Within the framework of the architectural design, a functional specification is established for each software component.

A functional specification of a software component describes the syntax and the semantics of the input data, the output data and the internal state of the software component as well as the processing algorithm, which determines how the output and the subsequent internal state are to be calculated from the input data and the initial internal state.

In a large project, independent project teams use the functional specification of each software component to develop the program code for the corresponding software component. The program development normally takes place on a development system, which supports convenient tools for testing and debugging the program code and for performing a simulation. To facilitate the program development, the development system normally supports more functions than the target hardware, e.g. additional functions for interactively simulating the execution of the programs.

We refer to the implementation of a software component on the development system, e.g. on a personal computer of the development system, as a simulation process.

The final versions of the software components are used on the target hardware. The term target hardware is understood to mean the distributed hardware environment that is employed in a planned product.

We refer to the implementation of a software component on the target hardware as an operative process. In a real-time system, the operative processes must fulfill not only the provisions of the functional specifications but must also satisfy the real-time constraints indicated in the description of the task. The processing time of an operative process on the target hardware depends upon the capacity of said hardware.

Within the scope of system integration, the software components that were developed separately on the development system must be ported to the target hardware, wherein it is necessary to abide by the stated real-time constraints.

A problem addressed by the present invention is that of indicating a device for integrating the software components from a development system on a target hardware as well as a corresponding method for the gradual implementation of this integration of the software components on the target hardware.

This problem is solved by the previously mentioned device such that, according to the invention, the device is configured as an expanded development system, in which expanded development system the computing nodes of the target hardware are connected to the computers of the development system via one or more time-controlled distributor units, wherein the expanded development system has a sparse global time of known precision, and wherein the computing nodes of the target hardware are connected to the computers of the development system via the one or more time-controlled distributor units such that the data content of a TT message template of a TT platform of the target hardware can be provided in a timely manner both by a simulation process of the development system as well as by an operative process of the target hardware.

Furthermore, this problem can also be solved in an advantageous way by the aforementioned method, in which the integration of the software components is implemented in multiple phases, wherein, during the first phase of the integration, the TT message templates, which are exchanged between the parallel executable software components, are specified and a TT platform, in which the periodic transmission and reception times of each TT message template are defined, is formed by the TT message templates, and wherein the data contents of the TT message templates are first provided by simulation processes and later by operative processes during the phases of the integration which follow, and wherein, during a final phase of the integration, the data contents of all TT message templates are provided by operative processes.

It may be advantageous if the activation signals for starting the software components are defined during the first phase of the system integration.

It may be provided that the TT platform monitors the defined CPU run-time of a software component on the target hardware.

It may be practical for the TT platform to define memory areas for the data structures of a software component and to monitor access by the operative processes to these memory areas.

A development system that is expanded by the target hardware and in which messages can be exchanged between the development system and the target hardware while observing given real-time constraints is considered an expanded development system.

In a time-controlled real-time system, the software components are activated periodically, wherein the flow of data between the software components is implemented with periodically time-controlled TT messages (TT="time-triggered"). The structure of this type of periodic system is described in [1], and it explains how the processing time of an operative process on the target hardware and how the transport times of the TT messages exchanged on the target hardware between the software components can be determined.

The term TT message template refers to an abstraction of a time-controlled message in which the following attributes of a TT message are specified: Period duration, message length, message sender and message receiver. Since the concrete application data of a message template do not have to be included, the TT message templates can be specified as long as the processing times of the operative processes on the target hardware and the transport times of the TT messages that are exchanged between the software components have been defined.

The term TT platform is understood to be a time-controlled architecture level of a distributed real-time system on which TT message templates are exchanged between software components at periodically recurring times. Hereafter, the TT platform provides the environment for the implementation of the software components, monitors the run-time and the memory accesses by the software components and produces the signals for the start of the implementation—the activation signals—of the software components. A signal is an event that occurs at a point in time.

A device is described that makes it possible for the data content of TT message templates of the TT platform of the target hardware to be produced in a timely manner both by means of a simulation process of the development system and by means of an operative process of the target hardware. The message content of a message template is produced in a timely manner when the message content contains the results of the upstream period and where the writing of the message was finished chronologically before the a priori chosen point at which the time-controlled message in question was transmitted.

To be able to create the relationship chronologically before in the expanded development system in a way that is clear and consistent system-wide, a global sparse time must be established in the expanded development system. Events that are placed in temporal relation to each other, e.g. the completion of the writing of the message content and the transmission time of the message in question, can be tagged only with the time stamp of the active interval of the sparse time. The duration of the active and passive intervals of the sparse time is determined by the precision of the clock synchronization [4]. An event A is chronologically before the event B only if the following applies:

(global sparse time stamp of $A$)<(global sparse time stamp of $B$).

The system integration can be divided into multiple phases, wherein the TT platform is established on the target hardware during the first phase of system integration, and the contents of the TT message templates of said TT platforms are gradually made available during the subsequent phases, first by the simulation processes and then by operative processes. In the final phase of system integration, the operative processes produce all contents of the TT message templates.

Hereafter, the invention is explained in greater detail on the basis of the drawing.

The following concrete example relates to one of the many possible ways to implement the present invention.

Figure 1:
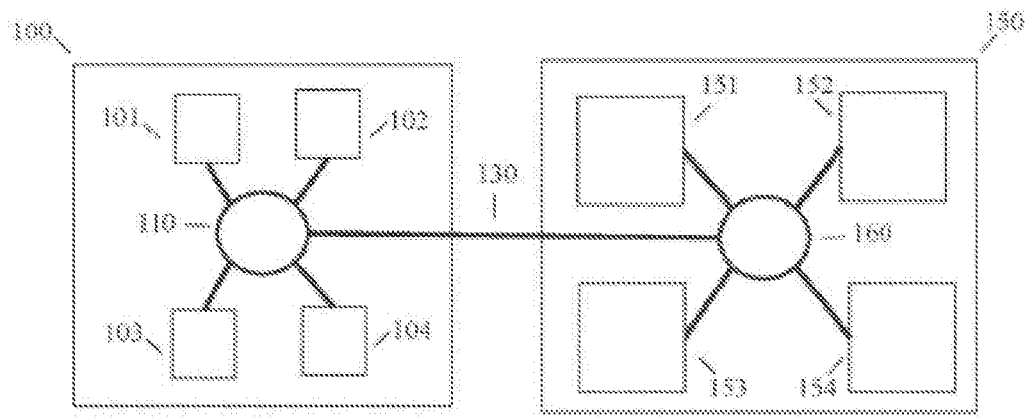
FIG. 1 shows the structure of an exemplary expanded development system.

The structure of an expanded development system is shown in FIG. 1. It consists of a target hardware 100 of a development system 150. These two systems are linked by a communications channel 130, on which time-controlled messages can be transported.

In FIG. 1, the target hardware 100 consists of four computing nodes 101, 102, 103, 104, which can exchange time-controlled messages with each other via a distribution unit 110 and with the development system 150 via the communications channel 130. In a computing node, e.g. in computing node 101, multiple partitions for executing software components can be provided by the TT platform of a hypervisor.

The development system 150 shown in FIG. 1 consists of four computers, e.g. personal computers 151, 152, 153, 154, which can exchange time-controlled messages with each other via a time-controlled distribution unit 160 and with the target hardware via the communications channel 130.

Figure 2:
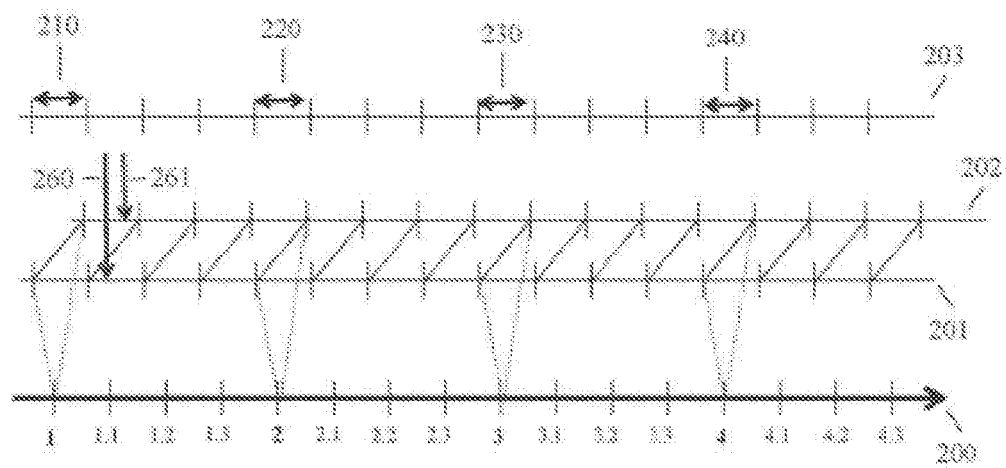
FIG. 2 shows the structure of a sparse global time.

FIG. 2 shows the structure of the global time. The progress of the global time is shown on the abscissa 200. The bars on lines 201 and 202 represent the ticks of clocks 201 and 202.

In a distributed system, it is practically impossible to synchronize clocks exactly. For this reason, the corresponding ticks of synchronized clocks, which are connected by dashed lines in FIG. 2, can deviate from one another. This deviation is referred to as a synchronization error. The maximum synchronization error of the corresponding ticks of two clocks in an ensemble of clocks, which depends on the synchronization algorithm and the quality of the clocks, is known as the precision of a clock ensemble. The precision subsequently determines the granularity of a digital time base [4]. The digitalization results in a digitalization error with the same order of magnitude as the synchronization error.

Owing to the synchronization error and the digitalization error, it is possible that event 260, which occurs before event 261 and which receives time stamp 1.1 from the clock 201, has a later time stamp than event 261, which is monitored by clock 202 and receives time stamp 1.0. Since 1.1>1.0, the time stamp leads to the false assumption that event 260 occurred after event 261.

To prevent this inconsistency, a sparse time base 203 is introduced in the expanded development system, where sparse events can occur only in the intervals 210, 220, 230 and 240 and where these intervals—the global time stamps—are identified with the whole numbers 1, 2, 3 and 4. Since the time lag of sparse events is greater than the sum of the synchronization error and the digitalization error, the temporal order of sparse events in the distributed system can be consistently determined on the basis of their time stamps.

According to the structure of the TT platform, the distribution units 110 and 160 in the expanded development system are parameterized during the first phase in such a way that the data contents of the message templates of simulation processes can be calculated and written to the message templates of the TT platform in a timely manner. Subsequently, these data contents are gradually calculated by a process of the target hardware 100 until all data contents of the TT platform are calculated by the executing operative processes on the target hardware 100 during the final phase.

The device described supports the gradual integration of the software at a point at which some project teams on a large project have not even completed their program code. If the final program code is not yet available, the data content of a message template can be provided by a simple utility program, which is run on the development system. A simple utility program such as this makes available the data contents from the permitted data field of a TT message template.

The present invention simplifies the laborious integration of software components in a time-controlled distributed computer system and therefore provides a significant economic benefit.

CITED LITERATURE

[1] PCT Application PCT/AT2015/050055 by the company FTS Computertechnik GMBH on 3 Mar. 2015: *Verfahren zur verteilten Entwicklung von Prozessprogrammen eines verteilten Echtzeitsoftwaresystems auf einer verteilten Entwicklungshardware* [Apparatus and Method for the Distributed Development of Process Programs of a Distributed Real-Time Software System on a Distributed Development Hardware].

[2] U.S. Pat. No. 7,937,500. Fletcher et al. *Dynamic Real-Time Integration of Software Resources through Services of a Content Framework*. Granted May 3, 20111.

[3] US Pat. Application 20030140333. Odaka et al. *Integration of Computer System Components*. Published Jul. 24, 2003.

[4] Kopetz, H. *Real-time Systems-Design Principles for Distributed Embedded Applications*. Springer Verlag, 2011.

[5] Wilhelm, R. et al. (2008). *The Worst-Case Execution Time Problem—Overview of Methods and Survey of Tools*. ACM Trans, on Embedded Computer Systems, Vol. 7(3). (pp. 1-53).

The invention claimed is:

1. A method for integrating software components of a distributed real-time software system on a device, said software components of the distributed real-time software system being run on target hardware and on a development system, wherein the target hardware comprises computing nodes, and wherein the development system comprises one or more computers, the method comprising:

configuring the device as an expanded development system in which the computing nodes of the target hardware are connected to the one or more computers of the development system via one or more time-triggered distributor units, wherein the expanded development system has a sparse global time of known precision, and wherein the computing nodes of the target hardware are connected to the one or more computers of the development system via the one or more time-triggered distributor units such that data content of a time-triggered message template of a time-triggered platform of the target hardware is configured to be provided in a timely manner both by a simulation process of the development system as well as by an operative process of the target hardware, wherein the time-triggered message template comprises an abstraction of a time-controlled message; and implementing an integration of the software components in multiple phases, wherein during a first phase of the integration, (i) the time-triggered message template, which is exchanged between parallel executable software components, is specified and (ii) the time-triggered platform, in which periodic transmission and reception times of the time-triggered message template are defined, is formed by the time-triggered message template, wherein the data content of the time-triggered message template is first provided by the simulation process and later by the operative process during phases of the integration which follow, and wherein during a final phase of the integration, the data contents of the time-triggered message template are provided by the operative process.

2. The method according to claim 1, further comprising defining activation signals for starting the software components during the first phase of the integration.

3. The method according to claim 1, further comprising monitoring, by the time-triggered platform, a defined central processing unit run-time of the software component on the target hardware.

4. The method according to claim 1, further comprising:
defining, by the time triggered platform, memory areas for data structures of the software component; and
monitoring, by the time triggered platform, access by the operative process to the memory areas.

5. The method according to claim 1, wherein the abstraction of a time-controlled message in which attributes of the time-triggered message template are specified as follow: period duration, message length, message sender, and message receiver.

6. The method according to claim 5, wherein the time-triggered message template is configured to be specified when processing times of the operative process on the target hardware and transport times of the time-triggered message template that is exchanged between the software components are defined.

* * * * *